3,256,150
METHOD FOR TREATING MALABSORPTION SYNDROME
John H. Nelson and Ward E. Brown, Waukesha, Wis., assignors to Dairyland Food Laboratories, Inc., Waukesha, Wis., a corporation of Wisconsin
No Drawing. Filed Apr. 20, 1964, Ser. No. 361,269
3 Claims. (Cl. 167—55)

This invention relates to the treatment of certain digestive disorders in humans and particularly relates to disorders commonly caused by certain foods or classes of foods.

The condition contemplated herein is commonly referred to as celiac disease or malabsorption syndrome. This includes a variety of related conditions which result in chronic nutritional failure and is more generally found in young children. The primary symptoms of such conditions are (1) pale, bulky, offensive stools; (2) abdominal distention; (3) wasting which may be extreme; (4) stunting of growth which may be severe; (5) severe anorexia, often accompanied by other nervous symptoms; and (6) clinical evidence of vitamin and mineral deficiencies. The syndrome is believed to result from a number of disturbances such as mechanical obstructions in the digestive system, pancreatic insufficency of several types, dietary deficiency, allergy in the gastro-intestinal tract, or chronic infection. Malabsorption syndrome also refers to cystic fibrosis of the pancreas, pancreatic dysplasia, and some other pancreatic disorders resulting from specific diseases such as mumps and tuberculosis. (Textbook of Pediatrics, Seventh Edition, 1959 by Waldo E. Nelson.)

The primary object of this invention is to provide a treatment which will alleviate the disturbances commonly associated with malabsorption syndrome.

Some manifestations of the syndrome may be observed in infants from the time of birth. However, the syndrome assumes clinical importance most frequently at around two years of age. The syndrome may continue for several years, then diminish gradually as the child grows and begins to mature. A definitive symptom of the syndrome is excessive fat content in the stools. This excess fecal fat is often split, e.g. exists as free fatty acids or soaps. There appears to be no impairment in fat digestion as evidenced by normal bile acid and pancreatic lipase levels in the intestine. However, lower tolerance curves for olive oil, butterfat, and vitamin A are often recorded. There are often low tolerances for glucose and starch. Symptoms of protein deficiency often occur. Although there are certain types of foods which should be avoided, treatment by means of dietary management is largely a matter of trial and error, based upon the response of the patient.

Some physicians administer a pancreatic extract containing particularly pancreatic lipase for the alleviation of some symptoms of the syndrome. We have found that the administration of an enzyme preparation which contains particularly a pregastric esterase system will produce results superior to those produced by a pancreatic extract. We obtain the pregastric esterase systems from the tongue and oral tissues of calves, kid goats and lambs. This tissue is defined as the edible tissue taken from between the base of the tongue and the trachea of the animals. Pregastric esterases are also present in tongue and oral tissues of Java monkeys, rabbits, and dogs which may be possible sources of such systems. There are also indications of pregastric esterase activity as evidenced by assay of the tongue or stomach contents of the pig and the human.

The enzyme preparation can be prepared in a variety of ways. One method of preparing the composition is to grind the tissue until it passes through ¼ to ½ inch holes in a grinder plate. The ground tissue is thoroughly mixed with up to 15% by weight of sodium chloride to inhibit bacterial action. The mixture of tissue and salt may be held in cold storage (40–48° F.) if subsequent steps in the procedure are not to be done at once. Equal weights of the tissue-salt mixture and of nonfat dry milk (2% moisture) are mixed and/or ground to homogeneity, the milk powder being made by either the roller or spray methods. The milk powder serves as a diluent to facilitate future drying of the mixture and grinding to small particle size. We have found that other milk constituents or edible diluents may be used, such as starch or propyleneglycol, so long as they do not adversely affect the esterase activity during processing and storage.

Where the presence of sodium chloride is considered objectionable because of its possible toxic effect, it may be omitted from the above preparation. The tissue is then ground until it passes through ¼ to ½ inch holes in a grinder plate and then mixed and/or ground with an equal weight of nonfat dry milk (2% moisture) as described above.

The mixture from either of the above preparations is then "chopped" in a hammermill with the blades forward to further mix the tissue-salt (or tissue) and milk powder and to break up any agglomerated masses. The mixture is then dried at not more than 110° F. with sufficient circulation of the air to keep the temperatures of all parts of the mixture substantially uniform, the drying being continued until the moisture content of the mixture has been reduced to 7% or less. Although the mixture may be dried at a tempearture as high as 110° F., it is preferable to keep the temperature approximately 105° F. The principal result to be achieved in the drying step is to remove as much as possible of the water from the tissue fraction of the mixture, which was originally in the tissue or was absorbed therefrom by the milk powder. The milk powder itself has only approximately 2% water content which cannot be removed at temperatures below 110° F. Under some atmospheric conditions, it is necessary to continue the drying process for as much as 48 hours to obtain a sufficiently dry material, but 24 hours is usually sufficient under average atmospheric conditions.

The dried mixture is then pulverized in a hammermill using a 40 mesh screen to particle sizes approximating those of the milk powder. In the present instance, the particles are substantially all of such size as to pass a 60 mesh screen.

The enzyme content of the pregastric esterase composition is now determined. The pregastric esterase concentration is expressed in pregastric esterase units and is defined by the amount of enzyme activity determined by a standard test procedure.

The standard conditions of test include: the preparation of an aqueous suspension of enzyme which contains an accurately weighed quantity of enzyme in 100 ml. of distilled water, the incubation of an aliquot of enzyme suspension in buffered B. naphthyl laurate ester solution at 42–44° C. for 20 minutes, followed by inactivation of the enzyme, color development, and spectrophotometric reading of the end product.

The result optical density value is converted to a test value using a table computed for the purpose. The test value divided by the weight of preparation in the aqueous suspension gives calf pregastric esterase units per gram:

$$\text{Units CPE/gm.} = \frac{\text{Test value}}{\text{Wt. enzyme preparation in suspension}}$$

This value times 28.35 gives CPE units per ounce.
This value times 454.0 gives CPE units per pound.

As a practical example, a sample from each batch of calf pregastric mixture is diluted in the proportion of 100 ml. of distilled water for each 0.4 gram of mixture. The aqueous suspension is then tested under the optical density test. Assuming that the material tested at an optical density test value of 30, the material would contain 75 CPE units per gram (30/0.4 gms.=75). We prefer to use a composition which produces a test value in the range of 30–50 (75 CPE units/gm. to 125 CPE units/gm.). Each batch is then marked to show its test value and blended with other batches to obtain a mixture having a test value within the preferred range.

We have administered pregastric esterase preparation in powdered form orally in a capsule form and as a free powder mixed with fluids or other foods. In our studies we varied the level of dosage over a wide range. The variation in dosage was dictated by the age and weight of the patient, the patient's previous medical history, and the number and severity of symptoms of the syndrome exhibited by the patient in addition to the desire to conduct experimental studies at several levels. Dosage levels of from 20 pregastric esterase units to 6,000 pregastric esterase units per day were administered within the group of patients studied. In certain patients the levels near the low end of this range were effective in substantially alleviating all symptoms of the syndrome. In other patients the levels near the high end of the range were required to control effectively the conditions of the syndrome encountered. No symptoms were observed which indicated side effects resulting from administration of the pregastric esterase preparation.

The pregastric esterase is administered in the powdered form either directly or by mixing it with the formula or in the daily diet. An initial dosage level of one teaspoon of pregastric esterase powder three times a day has generally been administered. In weighing trials a rounded teaspoon contains approximately 4.8 grams of pregastric esterase powder. This powder had a test value of 30 and, therefore, contained approximately 720 pregastric esterase (PGE) units per teaspoon. The daily dosage level can be increased by increasing the daily dosage or using a pregastric esterase having a higher test value. The powder can also be sealed in packages or capsules containing a predetermined number of pregastric esterase units.

The age of the patients studied ranged from a few weeks to 12 years. Some patients received pregastric esterase over a total interval of 18 months. In the majority of cases studied the administration of pregastric esterase alleviated most of the symptoms of the syndrome exhibited by the patients. Some or all of the following results have been observed after patients were placed on pregastric esterase medication: (1) the rate of weight gain improved significantly; (2) abdominal cramps subsided; (3) there was a marked diminution, in some cases almost a complete elimination, of diarrhea and foul smelling stools; (4) food tolerance and appetite had improved, patients had been able to eat a much wider variety of foods without discomfort or other ill effects; (5) as a consequence of the improvements of some or all of the foregoing factors, the general health of the patients has improved and they have become more resistant to respiratory infection.

The foregoing disclosure illustrates the effects of our invention. It will be apparent to anyone knowledgeable in the medical arts that a variety of related disorders in which the principal symptoms are similar to those of malabsorption syndrome may benefit from this invention.

We claim:

1. The method of treating malabsorption syndrome in humans comprising the steps of,
   orally administering to the afflicted person up to 50 grams per day of a powdered composition containing nonfat dried milk powder and edible tissue taken from the oral cavity of milk fed animals,
   the composition being standardized to contain 75 to 125 pregastric esterase units per gram,
   said units being derived from said tissue.

2. The method of treating malabsorption syndrome in humans comprising the step of orally administering to the afflicted person an enzyme composition containing pregastric esterase from the oral cavity of milk fed animals, the dosage being selected to make available to the afflicted person from 20 up to 6,000 pregastric esterase units per day.

3. The method of treating malabsorption syndrome in humans comprising the step of orally administering to the afflicted person up to 50 grams per day of an enzyme composition containing pregastric esterase from the oral cavity of milk fed animals and standardized to contain 75 to 125 pregastric esterase units per gram.

References Cited by the Examiner

UNITED STATES PATENTS 3,081,225    3/1963    Farnham _____ 167—53

JULIAN S. LEVITT, *Primary Examiner.*

S. ROSEN, *Assistant Examiner.*